(12) United States Patent  
Sabatie

(10) Patent No.: US 7,000,548 B2
(45) Date of Patent: Feb. 21, 2006

(54) SELF-PROPELLED CARRIAGE SUITABLE FOR MOVING IN A CYLINDRICAL GALLERY

(75) Inventor: Jean-Marc Sabatie, Nanterre (FR)

(73) Assignee: Compagnie du Sol, Nanterre (FR)

( * ) Notice: Subject to any disclaimer, the term of this patent is extended or adjusted under 35 U.S.C. 154(b) by 0 days.

(21) Appl. No.: 10/258,162

(22) PCT Filed: May 4, 2001

(86) PCT No.: PCT/FR01/01367

§ 371 (c)(1),
(2), (4) Date: Oct. 18, 2002

(87) PCT Pub. No.: WO01/84039

PCT Pub. Date: Nov. 8, 2001

(65) Prior Publication Data

US 2003/0075366 A1    Apr. 24, 2003

(30) Foreign Application Priority Data

May 4, 2000    (FR) ................................ 00 05694

(51) Int. Cl.
*B61B 13/10* (2006.01)
(52) U.S. Cl. .................................. 104/138.1
(58) Field of Classification Search ............ 104/138.1, 104/138.2, 139, 106, 108, 109
See application file for complete search history.

(56) References Cited

U.S. PATENT DOCUMENTS

| | | | |
|---|---|---|---|
| 3,872,940 A |   | 3/1975 | Gambini |
| 4,113,202 A | * | 9/1978 | Ueno .......................... 406/185 |
| 4,369,713 A | * | 1/1983 | Richardson ............... 104/138.2 |
| 4,512,258 A | * | 4/1985 | Matsukata ................ 104/138.1 |
| 4,526,106 A | * | 7/1985 | Okada et al. ............. 104/138.2 |
| 6,107,795 A | * | 8/2000 | Smart .......................... 324/220 |

FOREIGN PATENT DOCUMENTS

WO        WO 99/43529        9/1999

\* cited by examiner

Primary Examiner—S. Joseph Morano
Assistant Examiner—Robert J. McCarry, Jr.
(74) Attorney, Agent, or Firm—Merchant & Gould P.C.

(57) ABSTRACT

The invention relates to a self-propelled carriage suitable for traveling in a gallery of substantially cylindrical shape. The carriage comprises a chassis (1) made up of two wheel sets (14); a skip (10); and a horizontal longitudinal support axis (16) on which said skip is pivotally mounted. Each wheel set comprises two arms (24, 26) each having a first end pivotally mounted on one end of said axis; two rotary drive shafts (32) extend orthogonally to the support axis and are mounted at the opposite ends of the arms; drive means (38) for rotating said shafts; and two wheels (40, 42), each wheel comprising a hub (54) secured to a respective drive shaft, at least one circular disk secured to the hub, and having its periphery fitted with a plurality of rollers mounted to rotate freely about axes that are orthogonal to the axis of the wheel.

11 Claims, 5 Drawing Sheets

SELF-PROPELLED CARRIAGE SUITABLE FOR MOVING IN A CYLINDRICAL GALLERY

The present invention relates to a self-propelled carriage suitable for moving in a gallery of substantially cylindrical shape.

More precisely, the invention relates to a self-propelled carriage capable of moving inside a gallery made in the ground by a tunneling machine, the self-propelled carriage acting as a service vehicle for the tunneling machine. It can be used in particular for taking voussoir elements to the tunneling machine and for taking excavated material away therefrom.

In known solutions, rails are laid on the bottom of the gallery and the carriage(s) is/are moved therealong, said rails serving in particular to guide the carriage when the gallery is not rectilinear.

That widely-adopted solution naturally presents the drawback of requiring rails to be laid inside the gallery fitted with the voussoirs, or more precisely with its lining.

Another solution would be to provide a steering system on the carriage for control by a user, enabling the carriage to be steered when the gallery presents a curved portion. Naturally, adding a steering assembly would make the carriage more complicated to construct and would make it necessary for an operator to be present during displacements of the carriage.

An object of the present invention is to provide a self-propelled carriage capable of moving in such a gallery without it being necessary to lay rails and while avoiding any need to provide the carriage with specific steering control means enabling it to negotiate any portions of the gallery that are not rectilinear.

To achieve this end, the invention provides a self-propelled carriage suitable for moving in a gallery of substantially cylindrical shape, the carriage being characterized in that it comprises:

a chassis constituted by two wheel sets, respectively a front set and a rear set;

a skip; and a horizontal longitudinal support axis on which said skip is pivotally mounted in its length direction, each wheel set being connected to a respective end of said support axis.

Each wheel set comprises:

two arms, a first end of each arm being pivotally mounted on one end of said support axis, said arms lying in a common plane orthogonal to said support axis;

means for maintaining the arms at a constant angular separation;

two rotary drive shafts, each drive shaft being pivotally mounted at the second end of a respective arm, said drive shafts being orthogonal to said support axis;

means for rotating said drive shaft; and two wheels, each wheel comprising a hub secured to a corresponding rotary drive shaft, at least one circular disk secured to the hub, and at its periphery a plurality of rollers for co-operating with the cylindrical wall of said gallery, each roller being mounted to rotate freely about an axis that is orthogonal to the rotary drive shaft of the wheel.

It will be understood that by having rollers which constitute a "tread" on each wheel, the axes of the rollers being substantially parallel to the main travel direction, the overall travel component of each wheel of a wheel set results from combining the main rectilinear displacement with the rolling displacement of the roller in a direction that is substantially orthogonal to the main travel direction. This vector sum of displacement for the carriage as a whole enables the carriage to negotiate curved portions of the gallery without it being necessary to provide it with a steering system. It will be understood in particular that the freedom of the rollers to roll avoids phenomena of friction and of jamming that would prevent or disturb displacement of the carriage where the gallery presents an axis that is not rectilinear.

In a preferred embodiment, the center of gravity of said skip lies beneath said skip support axis and likewise preferably, the center of gravity of each wheel set lies beneath the center of gravity of the skip. These preferred characteristics enable the mid-plane of the skip to return to a vertical position even in the event of a curve, and they encourage each set of wheels to return towards its equilibrium position, i.e. its position in which the mid-plane of the wheel set coincides substantially with the vertical.

Also preferably, each wheel comprises three mutually parallel disks secured to the wheel hub, the periphery of each disk being provided with said rollers. This disposition serves to increase the contact area between the wheels and the wall of the gallery, and thus to avoid damaging the wall by applying too great a point loading thereon.

Also preferably, the axes of the rollers on one of the disks are offset relative to the axes of the rollers on the other two disks around the peripheral direction of the disks. This offset provides the rolling surface made up by the rollers with "continuity" in the direction of the shaft of each wheel.

Other characteristics and advantages of the invention appear better on reading the following description of various embodiments of the invention given as non-limiting examples. The description refers to the accompanying drawings, in which.

Figure 1:
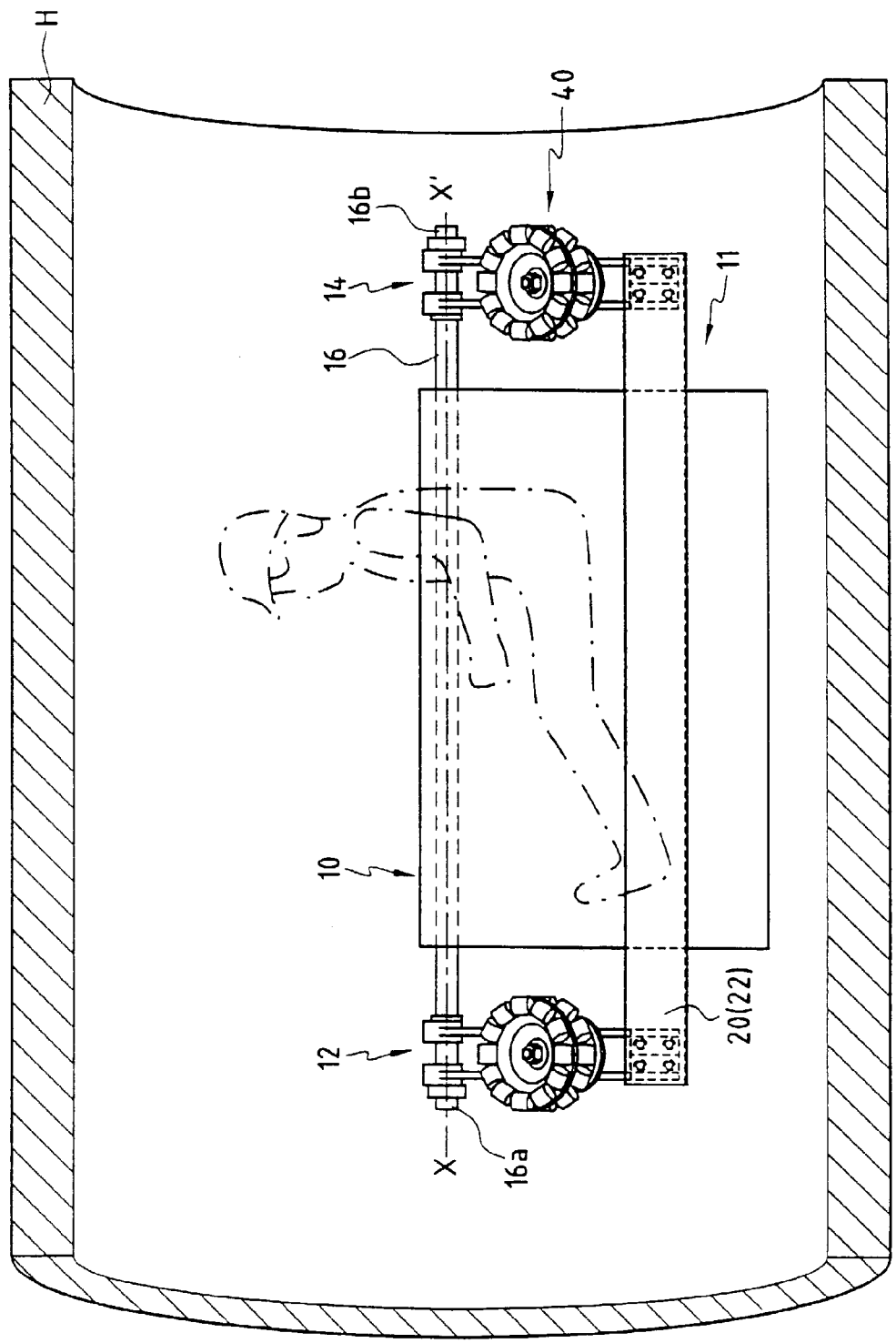
FIG. 1 is a side view of the self-propelled carriage.

A preferred embodiment of the self-propelled carriage is described below with reference initially to FIGS. 1 and 2. The carriage is essentially constituted by a skip 10 and by a chassis 11 having a front wheel set 12 and a rear wheel set 14. Since both wheel sets are identical, only the rear wheel set 14 is described, by way of example.

The skip 10 may be substantially semicylindrical in shape, and it is connected to the chassis 11 via a horizontal longitudinal axis 16, the skip 10 being pivotally mounted by means of bearings (not shown) engaging the axis 16. At each end of the axis 16, respectively referenced 16a and 16b, a respective one of the wheel sets 12 and 14 is mounted so that it is free to oscillate. As explained below, the wheel sets 12 and 14 are preferably interconnected by longitudinally extending members 20 and 22 which naturally extend outside the skip 10 and parallel to its longitudinal axis.

Figure 2:
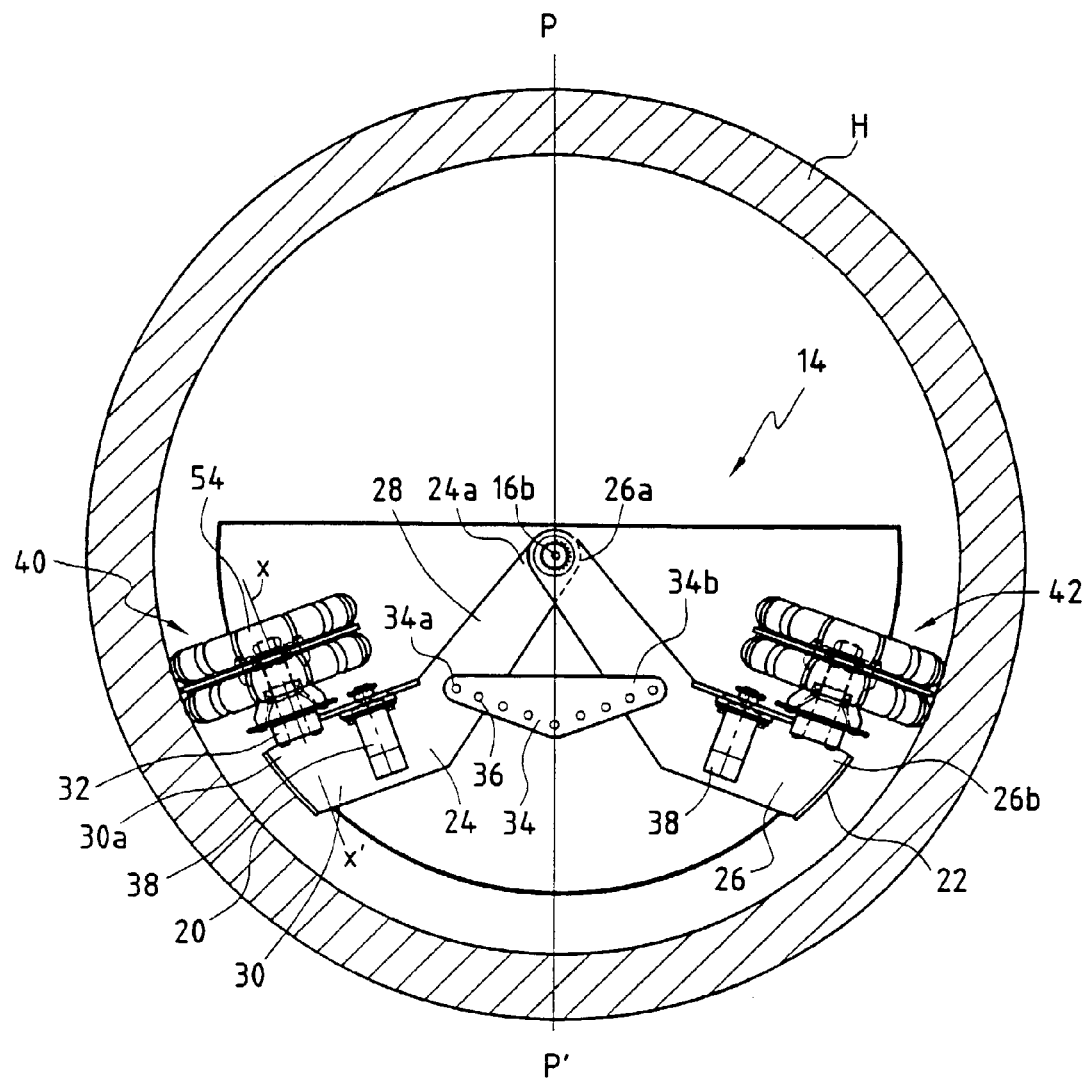
FIG. 2 is an end view of the self-propelled carriage with the wheel set in the rest position.

There follows a description of the rear wheel set 14 given with reference to FIG. 2. This wheel set comprises two substantially identical arms 24 and 26. A first end 24a, 26a of each arm is pivotally mounted via the end bearings 16b on the horizontal support axis 16. Each arm is preferably constituted by a first substantially rectilinear portion 28 and by a second portion 30 that extends at an angle relative to the first portion 28. The second end 24b, 26b of each arm carries a drive shaft 32 of axis x,x' orthogonal to the direction X,X' of the support axis 16. In addition, the ends of the longitudinal members 20 and 22 are secured respectively to the ends 24*b* and 26*b* of the wheel sets 12 and 14. The two wheel sets are thus secured to each other so as to constitute the chassis of the carriage. The angle between the two arms 24 and 26 in a given wheel set is maintained at a constant value by a spacer piece 34 whose ends 34*a* and 34*b* are secured to said arms. The spacer 34 has a plurality of fixing holes 36 thus enabling the angle between the two arms to be adjusted and thus enabling the wheel set to be matched to the diameter of the gallery in which the self-propelled carriage is to travel. Each arm 24, 26 is also fitted with a motor 38 which co-operates with the drive shaft 32 via suitable transmission means for causing each of the wheels 40 and 42 in each wheel set 14 to rotate.

Figure 4:
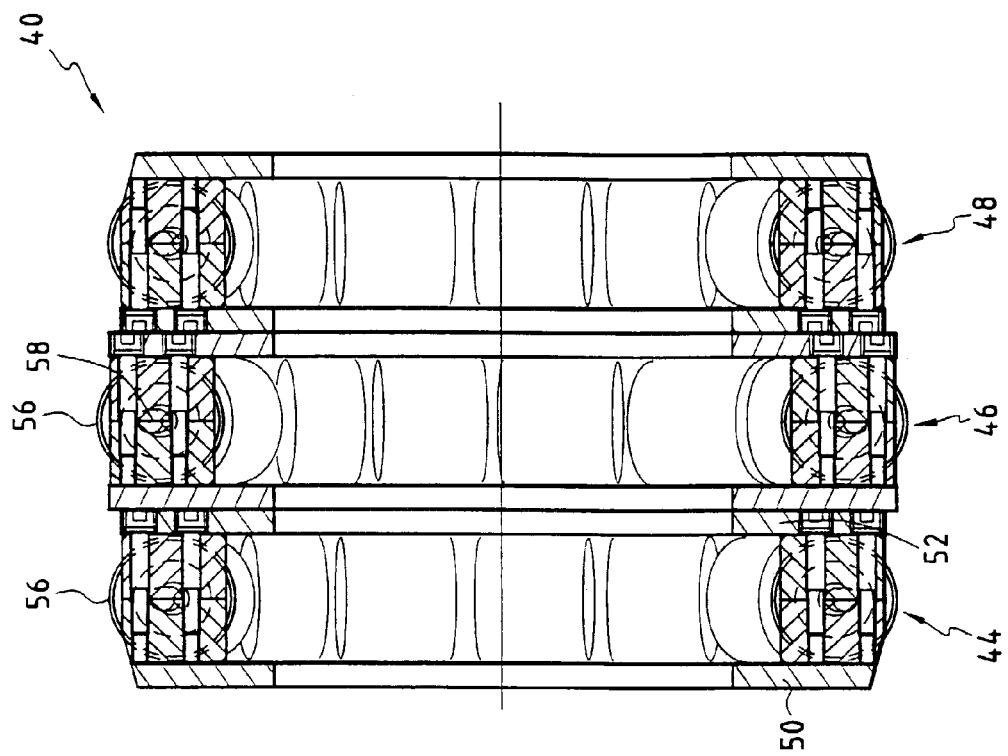
FIG. 4 is a diametral section view of a wheel of the carriage.
Figure 3:
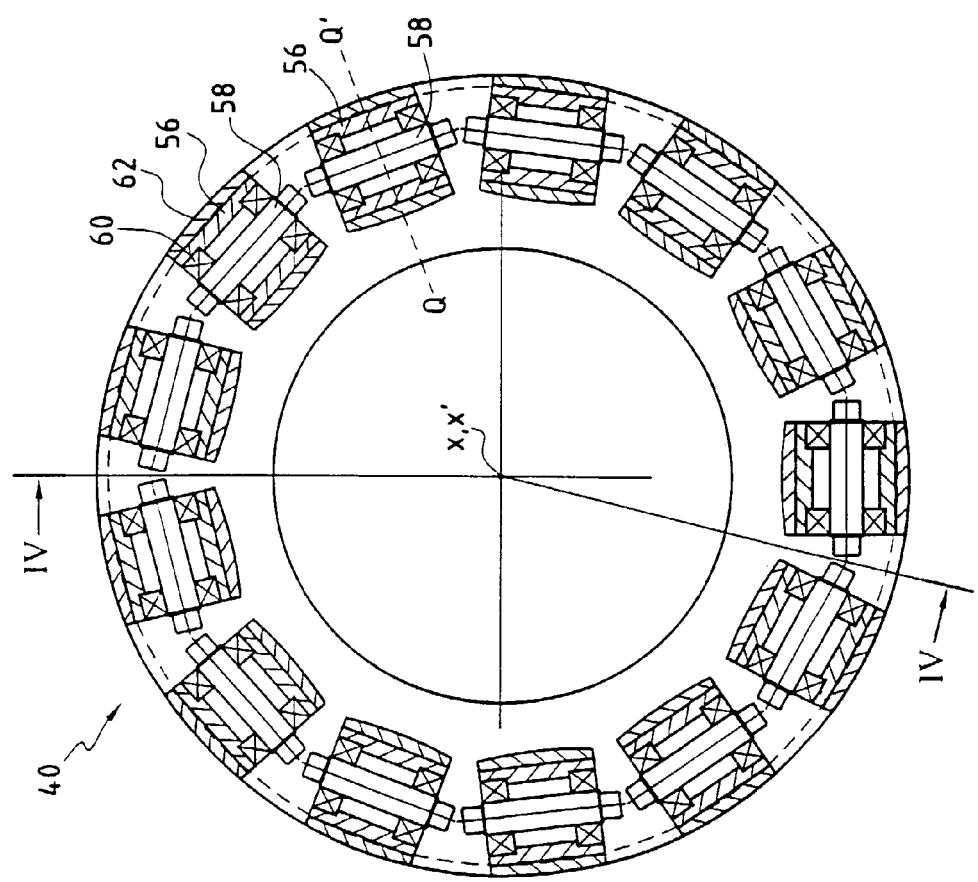
FIG. 3 is a face view of a wheel of the carriage.

As shown more clearly in FIGS. 3 and 4, and preferably, each wheel, e.g. the wheel 40, is made up of three parallel disks 44, 46, and 48 each constituted by a pair of cheek plates 50 and 52 fixed on a hub 54, itself secured to the drive shaft 32. At its periphery, each disk 44, 46, and 48 is fitted with rollers such as 56 which constitute a tread on each disk 44 to 48 and thus of the wheel 40 as a whole. These rollers are free to rotate about axes 58 secured to the cheek plates 50 and 52, these axes extending orthogonally to the axis x,x' of the drive shafts of the wheels, and thus to the axes of the wheels. The rollers 56 are regularly spaced around the periphery of the disks 44 to 48 and they are pivotally mounted about the axes 58 by means of bearings 60. The rollers 56 are preferably made of a material that has a low coefficient of friction and their outside faces are in the form of surfaces of revolution about axes that coincide with the axes 58, each surface of revolution being defined by a circular arc 62 so that each roller is generally barrel-shaped.

As shown more clearly in FIG. 4, it is preferable for the diameter of the circle on which the axes 58 of the wheels 56 of the middle disk 46 are disposed to be greater than the diameters of the corresponding circles for the disks 44 and 48 on either side.

Also, and preferably, the axes of the rollers 56*a* of the disk 44, 56*b* of the disk 46, and 56*c* of the disk 48 are angularly offset around the axis of the wheel so as to ensure that the "tread" of each wheel as made up of by the three series of rollers 56*a*, 56*b*, and 56*c* appears continuous when the wheel is observed along the direction of its own axis of rotation x,x'. In other words, the mid-planes Q,Q' of the rollers 56 extending orthogonally to their axes 58 are themselves offset from disk to disk.

Figure 5:
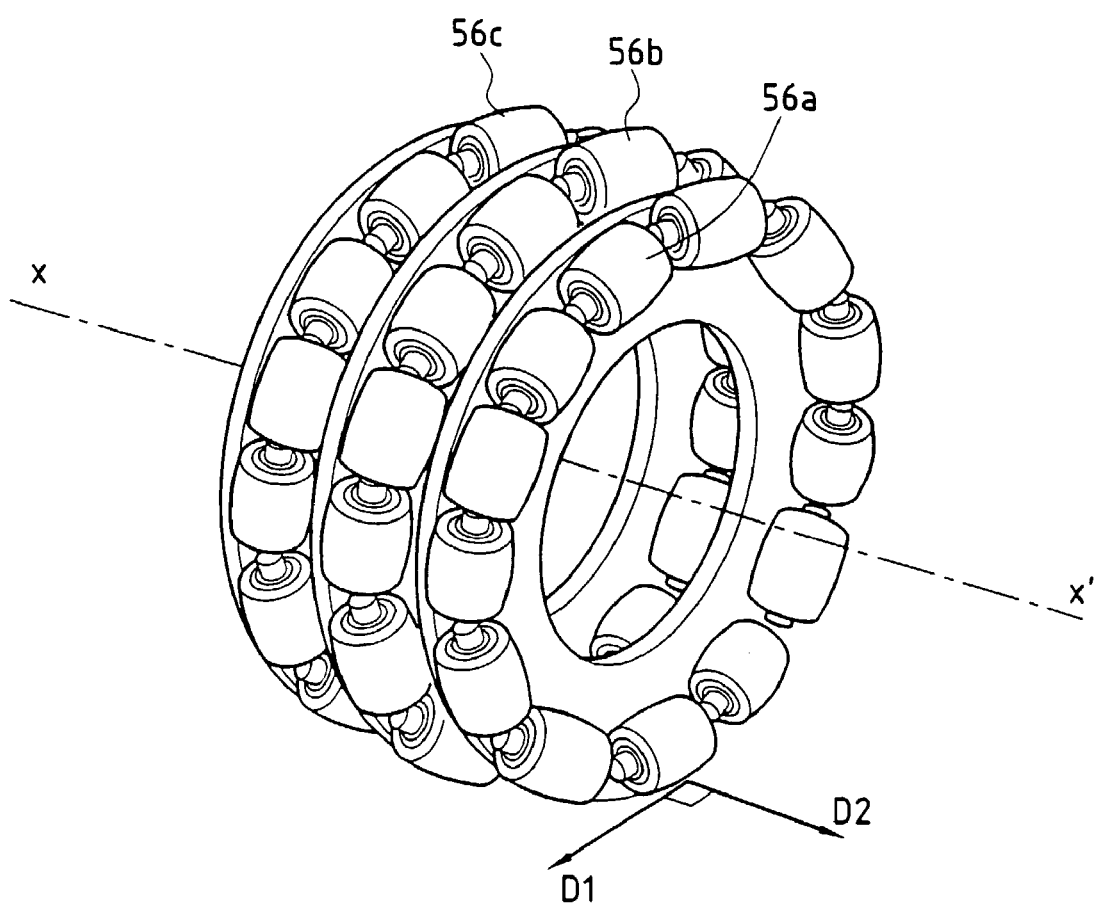
FIG. 5 is a perspective view of a wheel of the carriage.

As shown in FIG. 5, because of the presence of the rollers 56, each wheel 40, 42 is free to move relative to the wall on which it is running in directions that are the result of summing two possible displacement vectors, firstly a displacement D1 which is the result of the wheel as a whole turning about its axis x,x', and secondly a displacement D2 which is the result of the rollers being free to rotate, in particular the rollers that are in contact with the wall, about their own axes 58.

It will be understood that because of these two possible directions of displacement, the carriage as a whole can continue to move even if the gallery does not have a rectilinear axis and without requiring steering means to be provided for the carriage, with this being due to the transverse displacement component D2.

In FIG. 2, the self-propelled carriage is shown in a rectilinear portion of gallery. Both arms 24 and 26 of the wheel set are symmetrical about a vertical mid-plane P,P' of the gallery H.

In FIG. 2, the carriage is shown in a rectilinear portion of gallery H. In this situation, both arms 24 and 26 of each wheel set are symmetrical about a diametral vertical plane P,P' of the gallery. The same applies to the skip 10 of the carriage assuming that it is loaded symmetrically about its longitudinal support axis 16.

Figure 6:
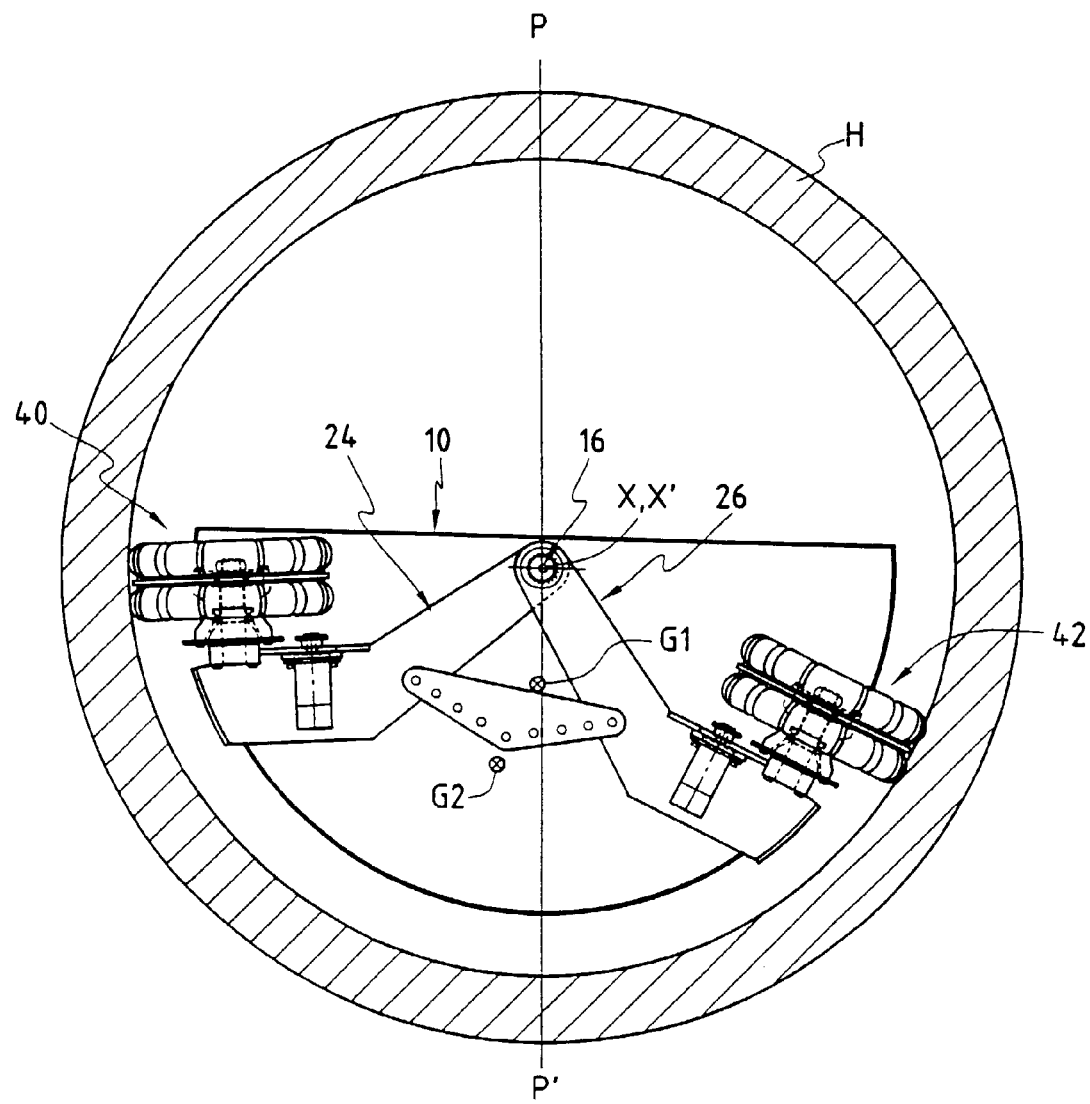
FIG. 6 is an end view of the carriage while it is negotiating a curve in the gallery along which it is traveling.

FIG. 6 shows the carriage in a portion of gallery H that is not rectilinear. In order to compensate for the fact that this portion of gallery is not rectilinear, the main longitudinal displacement of the wheel set along the axis of the gallery is combined, as explained above, with rotary movement of the rollers 56 carried by these wheels. This vector summing of different movements enables the wheel sets 12 and 14 as a whole to tilt about the vertical plane P,P' of the gallery, about the longitudinal support axis 16. This is shown in FIG. 6.

It is important to emphasize that because the center of gravity G1 lies beneath the support axis 16 of the skip 10, it tends to return to a vertical position as soon as the gallery H returns to a rectilinear profile. Similarly, and preferably, the wheel sets taken together present a center of gravity G2 which is naturally disposed beneath the support axis 16, but also beneath the center of gravity G1 of the skip. The movements that result from these relative positions for the centers of gravity tend likewise to return the wheel sets 12 and 14 to their vertical rest position (arms 24 and 26 symmetrical about the vertical plane P,P'), with this being the position shown in FIG. 2.

In the embodiment described above, it is stated that each wheel of the wheel sets is made up of three disks 44 to 48 each carrying rollers 56. Naturally, in some applications, each wheel could comprises a single disk fitted with the above-described rollers, or only two disks.

What is claimed is:

1. A self-propelled carriage suitable for moving in a gallery of substantially cylindrical shape that has no internal rail, the carriage comprising:

a chassis comprising no more than two wheel sets, respectively a front set and a rear set;

a skip; and a horizontal longitudinal support axis on which said skip is pivotally mounted in its length direction, each one of said two wheel sets being connected to a respective end of said support axis;

each one of said two wheel sets comprising:

two arms wherein each arm being a fixed length, a first end of each arm being pivotally mounted on one end of said support axis, said two arms lying in a common plane orthogonal to said support axis;

means for maintaining the two arms at a constant angular separation;

two rotary drive shafts, each drive shaft being pivotally mounted at a second end of the respective arm, said two drive shafts being orthogonal to said support axis;

means for rotating said two drive shafts; and two wheels, each one of said two wheels comprising a hub secured to a corresponding rotary drive shaft, at least one circular disk secured to the hub such that the disk is perpendicular to the drive shaft, said disk having a periphery at which a plurality of rollers for co-operating with the cylindrical wall of said gallery, the two wheels of each of the two wheel sets being in sole contact with the cylindrical wall of the gallery, each roller being mounted to rotate freely about an axis that is orthogonal to the rotary drive shaft of the wheel.

2. A carriage according to claim 1, wherein the center of gravity of said skip lies beneath said skip support axis.

3. A carriage according to claim 2, wherein the center of gravity of each wheel set lies beneath the center of gravity of the skip.

4. A carriage according to claim 1, wherein each wheel comprises three mutually parallel disks secured to the wheel hub, the periphery of each disk being provided with said rollers.

5. A carriage according to claim 4, wherein the rollers on each disk are regularly spaced apart angularly.

6. A carriage according to claim 5, wherein the mid-planes of the rollers orthogonal to the axes of rotation of the rollers on one disk are angularly offset relative to the corresponding mid-planes of the rollers on the other two disks.

7. A carriage according to claim 4, wherein all of the rollers are substantially identical, and the circle to which the axis of rotation of the rollers of the central disk are tangential is of diameter greater than the corresponding diameters of the two side disks.

8. A carriage according to claim 1, wherein said means for maintaining the two arms of a wheel set at a constant spacing are adjustable, thereby enabling said spacing to be adapted to match the diameter of said gallery.

9. A carriage according to claim 1, wherein the rolling surface of each roller is a surface of revolution about the axis of rotation of the roller and having a generator line constituted by a circular arc.

10. A carriage according to claim 1, farther comprising two longitudinally extending members parallel to said support axis, each longitudinally extending member securing one arm of one of the wheel sets to the corresponding arm of the other wheel set.

11. A self-propelled carriage suitable for moving in a gallery of substantially cylindrical shape that has no internal rail, the carriage comprising:
- a chassis comprising no more than two wheel sets, respectively a front set and a rear set;
- a skip; and
- a horizontal longitudinal support axis on which said skip is pivotally mounted in its length direction, each one of said two wheel sets being connected to a respective end of said support axis;
- each one of said two wheel sets comprising:
- at most two arms wherein each arm being a fixed length, a first end of each one of said two arms being pivotally mounted on one end of said support axis, said two arms lying in a common plane orthogonal to said support axis;
- means for maintaining the two arms at a constant angular separation;
- two rotary drive shafts, each drive shaft being pivotally mounted at a second end of the respective arm, said drive shafts being orthogonal to said support axis;
- means for rotating said two drive shafts; and
- two wheels constructed to ride directly on the internal surface of the gallery, each one of said wheels comprising a hub secured to a corresponding rotary drive shaft, at least one circular disk secured to the hub such that the disk is perpendicular to the drive shaft, said disk having a periphery at which a plurality of rollers for co-operating with the cylindrical wall of said gallery, each roller being mounted to rotate freely about an axis that is orthogonal to the rotary drive shaft of the wheel.

* * * * *